Feb. 6, 1962 P. A. LOWERY 3,019,457
INFLATABLE RUBBER DINGHIES
Filed Jan. 23, 1959
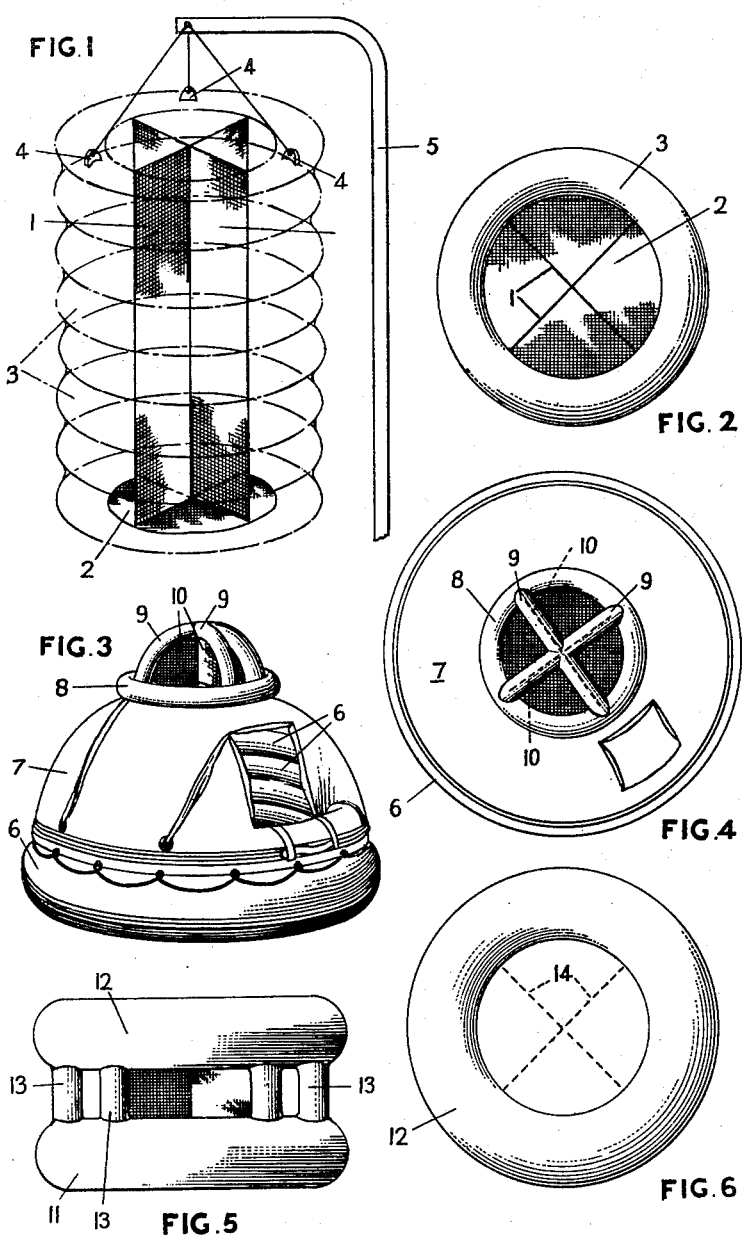
PETER ALBERT LOWERY
INVENTOR
BY
ATTORNEYS

United States Patent Office 3,019,457
Patented Feb. 6, 1962

3,019,457
INFLATABLE RUBBER DINGHIES
Peter Albert Lowery, Purley, England, assignor to Chemring Limited, Surrey, England, a British company
Filed Jan. 23, 1959, Ser. No. 788,655
4 Claims. (Cl. 9—11)

This invention is concerned with improvements in and relating to corner reflectors for use at sea generally for example with corner reflectors for use at sea in connection with dinghies, rafts, lifeboats and the like hereinafter referred to simply as boats.

One object of the present invention is to provide a corner reflector if improved construction. Another object is to provide an inflatable boat having a corner reflector connected thereto. Inflatable boats are now very often standard equipment in ships and aircraft for rescue purposes in case of a wreck. One difficulty when survivors have to take to an inflatable boat is for rescue parties to locate the boat on the surface of the sea. Beacon type aids to search and rescue such as "Rebecca" and "Sarah" are already well known and another object of the invention is to provide cheaper and improved apparatus as compared with known devices.

According to one feature of the present invention we provide a corner reflector adapted to be erected by inflation of supporting tubes. According to another feature of the invention we provide an inflatable boat characterised by the provision of a corner reflector adapted to be erected by inflation of supporting tubes and incorporated into the structure of the boat.

We prefer to make our inflatable corner reflector in such a way that radar responsive material e.g. metal coated plastic mesh is connected to plastic laminated supports, the assembly being erected by inflation of suitably arranged tubes forming a part of the assembly.

An inflatable rubber boat in the form of a dinghy usually consists of buoyancy tubes to float in the water and a double skinned canopy to provide an efficient thermal barrier to protect the occupants from heat and cold. Such a dinghy may generally speaking be of two types one in the shape of a circle and the other oval. According to another feature of the invention the construction of an inflatable dinghy is modified by mounting a corner reflector on the top of the canopy in such a way that the reflector is erected when the dinghy is inflated.

In order that the invention may be clearly understood and readily carried into effect, reference is now directed to the accompanying drawings given by way of example and in which:

FIGURE 1 is a side view of an inflatable corner reflector for general use with the tubes shown in dot and dash lines, and FIGURE 2 is a plan view thereof.

FIGURES 3 and 4 are respectively a side elevation and a plan of a circular inflatable dinghy with an inflatable corner reflector on top of the canopy, and FIGURES 5 and 6 are a side elevation and a plan of a dinghy having a centrally disposed corner reflector.

Referring to the drawings and particularly to FIGURE 1 a corner reflector comprises reflecting planes 1 disposed at 90° to each other and an end reflecting plane 2. These reflecting planes may be made of metal coated plastic mesh, suitably attached to inflatable tubes 3 so that when the tubes 3 are inflated the corner reflector is erected. A hook or loop 4 is provided so that if necessary the erected reflector may be hung up in an exposed position on a support 5. A reflector of this nature may be used with advantage on trawlers and other ships.

In FIGURES 3 and 4 a dinghy comprises inflatable tubes 6 and canopy 7. The top of the canopy has a circular inflatable tube 8 to which two arch-shaped support tubes 9 are connected. These tubes 9 are inflated when the dinghy is inflated and thus erect the corner reflector which has vertical planes 10 at 90° to each other and a horizontal plane disposed over the top of the canopy. The top of the canopy within the area confined by the tube 8 may also be used as a water catchment area.

In FIGURES 5 and 6 a different form of construction is illustrated. A dinghy has lower inflatable tubes 11, an upper inflatable tube 12 and inflatable pillars 13. The corner reflector is formed by the vertical planes 14 at 90° to one another and also by horizontal planes provided within the confines of the tubes 11 and 12. A dinghy of this kind may if desired be large enough ot take a load or alternatively this type of dinghy may simply be designed to act as a radar responsive dinghy and may be towed behind a single passenger carrying dinghy or a train of several passenger carrying dinghies. As a simple radar responsive dinghy it may be about 6' in diameter.

The radar responsive material may be plastic mesh coated with metal, for example silver coated nylon. Alternatively we may use flexible laminates comprising a radar reflective material such as aluminium or other metal foil or silvered nylon mesh or other vacuum metallised material inserted into position between plastic film or flexible resin film or a flexible adhesive film or flexible resin film or fabric or other material to provide a laminated flexible radar responsive assembly with means to support the radar responsive part of the assembly when erected.

One advantage of the present invention is that the various parts of the reflector are flexible; there are no rigid parts or metal spars and therefore the reflector cannot puncture an inflatable dinghy or other device with which it may be associated.

Connection of the corner reflector inside the tubes or to the tubes is preferably effected by high frequency sealing technique and the tubes may themselves be interconnected in this way. When sealing the tubes, flaps may remain on the inside and these flaps may be used for connecting the corner reflector to the tubes.

What I claim is:

1. An inflatable boat in the form of a dinghy comprising buoyancy tubes and a canopy characterised in this that a corner reflector is mounted on the top of the canopy the said reflector comprising radar responsive material arranged in the manner of a corner reflector and suitably connected to inflatable tubes forming arches over the top of the canopy so that when the dinghy is inflated the tubes forming part of the corner reflector are also inflated and the reflector is thereby erected without the aid of spars or other rigid parts.

2. In a survival boat for aviators or sailors comprising a buoyancy-providing base, a superjacent and inflatable but normally collapsed upstanding wall and roof-support-providing means carried by said base; the combination of a flexible roof-providing canopy overlying said wall and roof-support-providing means and secured to said base, an inflatable and endless tube carried by the roof-providing portion of said canopy as a reinforcement therefor, a collapsible corner reflector of radar responsive material providing upper and lower portions and having its lower portion secured to and within said endless canopy-carried tube, at least one upwardly projectable arch-form tube segment of collapsible material having its ends connected to and communicating with said endless tube, and the upper portion of said corner reflector connected to said tube segment, whereby when the endless tube and the arch form tube segment are inflated the corner reflector will be actuated vertically to operative position.

3. The structure of claim 2 and wherein there are two collapsible arch form tube segments connected to and communicating with said endless tube, and wherein the corner reflector comprises a sheet-like base element marginally secured to said endless tube and two angularly disposed and upstanding members rising from said base element, and said upstanding members secured to the respective collapsible arch form tube segments.

4. The structure of claim 2 and wherein there are two collapsible arch form tube segments connected to and communicating with said endless tube, and wherein the corner reflector comprises a sheet-like base element marginally secured to said endless tube and two angularly disposed and upstanding members rising from said base element, and said upstanding members secured to the respective collapsible arch form tube segments, and said inflatable wall and roof-supporting means communicating with said endless tube, whereby the latter and said arch form tube segments will be inflated when the upstanding wall and roof-providing means is inflated.

References Cited in the file of this patent

UNITED STATES PATENTS

| | | |
|---|---|---|
| 2,363,249 | Hutchinson | Nov. 21, 1944 |
| 2,534,716 | Hudspeth et al. | Dec. 19, 1950 |
| 2,576,255 | Hudspeth et al. | Nov. 27, 1951 |
| 2,854,049 | Wyllie | Sept. 30, 1958 |
| 2,888,675 | Prattetal | May 26, 1959 |
| 2,907,875 | Seyfang | Oct. 6, 1959 |
| 2,936,453 | Coleman | May 10, 1960 |

FOREIGN PATENTS

| | | |
|---|---|---|
| 673,417 | Great Britain | June 4, 1952 |
| 1,127,913 | France | Aug. 20, 1956 |
| 758,090 | Great Britain | Sept. 26, 1956 |
| 1,046,700 | Germany | Dec. 18, 1958 |